(12) United States Patent
Wakeford et al.

(10) Patent No.: US 9,479,466 B1
(45) Date of Patent: Oct. 25, 2016

(54) SYSTEM AND METHOD FOR GENERATING VIRTUAL SPACE MESSAGES BASED ON INFORMATION IN A USERS CONTACT LIST

(71) Applicant: KABAM, INC., San Francisco, CA (US)

(72) Inventors: Kent Wakeford, Hillsborough, CA (US); Clifford J. Harrington, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 714 days.

(21) Appl. No.: 13/901,496

(22) Filed: May 23, 2013

(51) Int. Cl.
| | |
|---|---|
| *G06F 15/16* | (2006.01) |
| *A63F 9/24* | (2006.01) |
| *G06Q 30/00* | (2012.01) |
| *H04L 12/58* | (2006.01) |
| *A63F 13/30* | (2014.01) |
| *G06F 9/455* | (2006.01) |

(52) U.S. Cl.
CPC ............... *H04L 51/00* (2013.01); *A63F 13/12* (2013.01); *G06F 9/45533* (2013.01)

(58) Field of Classification Search
CPC ..... H04L 51/04; H04L 12/581; H04L 51/10; H04L 67/306; H04N 7/157; G06F 9/45533; A63F 13/12; A63F 13/216
USPC .......................................................... 709/206
See application file for complete search history.

(56) References Cited

U.S. PATENT DOCUMENTS

| | | | | |
|---|---|---|---|---|
| 6,721,410 B1* | 4/2004 | Will | ................... | H04L 12/1818 379/201.11 |
| 7,145,898 B1* | 12/2006 | Elliott | ..................... | H04L 12/66 370/352 |
| 7,819,749 B1 | 10/2010 | Fish et al. | ........................ | 463/42 |
| 7,904,333 B1* | 3/2011 | Perkowski | ........ | G06F 17/30879 705/14.4 |
| 8,439,759 B1* | 5/2013 | Mello | ..................... | A63F 13/12 463/42 |
| 9,007,302 B1* | 4/2015 | Bandt-Horn | .......... | G06F 3/0202 345/156 |
| 9,094,476 B1* | 7/2015 | Singh | ...................... | G06F 13/00 |

(Continued)

FOREIGN PATENT DOCUMENTS

EP 1377002 10/2006

*Primary Examiner* — Margishi Desai
(74) *Attorney, Agent, or Firm* — Sheppard Mullin Richter & Hampton LLP (57) ABSTRACT

A system and method for generating virtual space messages based on information indicated by a contact list associated with a virtual space user are disclosed. The contact list may be obtained for the virtual space user and contact entries may be extracted from the obtained contact list. Individual contact entries may be correlated with users in the virtual space. In some examples, relationships between the virtual space and his/her contacts may be determined based on the information indicated by the contact entries. Virtual space messages, such as, but not limited to, to facilitate social interactions, mentorship, friendship and/or any other relationships between the virtual space user and his/her contacts within the virtual space may be generated and communicated to the client computing platforms associated with the contacts.

16 Claims, 3 Drawing Sheets

(56) References Cited

U.S. PATENT DOCUMENTS

| | | | |
|---|---|---|---|
| 2004/0111477 A1* | 6/2004 | Boss | G06Q 10/107 709/206 |
| 2005/0144422 A1* | 6/2005 | McAlpine | G06F 12/1081 711/206 |
| 2005/0210102 A1* | 9/2005 | Johnson | G06Q 30/02 709/204 |
| 2007/0255807 A1* | 11/2007 | Hayashi | H04L 12/58 709/219 |
| 2008/0215994 A1* | 9/2008 | Harrison | A63F 13/10 715/757 |
| 2009/0300122 A1* | 12/2009 | Freer | G06K 9/4604 709/206 |
| 2011/0161838 A1* | 6/2011 | Kang | G06Q 10/06 715/757 |
| 2012/0011450 A1* | 1/2012 | To | G06Q 10/10 715/752 |
| 2012/0191900 A1* | 7/2012 | Kunimatsu | G06F 12/0223 711/103 |
| 2012/0198016 A1 | 8/2012 | Pousti | 709/206 |
| 2013/0012293 A1 | 1/2013 | Walker et al. | 463/20 |
| 2013/0018952 A1* | 1/2013 | McConnell | G06Q 10/1093 709/204 |
| 2013/0073336 A1* | 3/2013 | Heath | G06Q 30/02 705/7.29 |
| 2013/0124538 A1* | 5/2013 | Lee | G06F 17/3053 707/749 |
| 2013/0138840 A1* | 5/2013 | Kegel | G06F 13/28 710/22 |
| 2013/0151632 A1* | 6/2013 | Chodavarapu | G06Q 50/01 709/206 |
| 2013/0331179 A1* | 12/2013 | Taylor | G06Q 10/10 463/29 |

* cited by examiner

SYSTEM AND METHOD FOR GENERATING VIRTUAL SPACE MESSAGES BASED ON INFORMATION IN A USERS CONTACT LIST

FIELD OF THE DISCLOSURE

This disclosure relates to providing virtual space communications by leveraging contact lists associated with users of the virtual space.

BACKGROUND

Virtual space systems that generate requests for users to establish virtual space connections with other users via email messages are known. For generating such requests, those systems typically obtain email addresses of contacts in a user's address book. Using the obtained email addresses of the contacts, those systems will generate and communicate, on behalf of the user, email messages to invite those contacts to join the virtual space. Some of those systems will also generate and communicate, on behalf of the user, email messages requesting those contacts to join a group of the user in the virtual space (e.g., my professional network).

SUMMARY

One aspect of the disclosure relates to dynamically generating virtual space messages on behalf of a first user to a second user in the virtual space based on contact information indicating contacts between the two users. The virtual space messages may be so generated to facilitate social interaction, mentorship, friendship, and/or any other relationships between the two users within the virtual space. For such facilitations, the contact information between the two users may be obtained from a contact list associated with the first user such as, e.g., an address book stored on a device associated with the first user, a contact register stored in a third party service account of the first user, a contact file stored on a client computing platform associated with the first user, and/or any other source that provide one or more of a contact list associated with the first user. In some examples, the obtained contact information may be analyzed and a real-world relationship between the two users may be determined. The determined real-world relationship between the two users may indicate that they are friends, co-workers, classmates, relatives, and/or any other real-world relationships between the two users. Virtual space messages, such as, but not limited to, requesting social interactions (e.g., virtual space group activities, collaboration, competition, and/or any other social interactions facilitated by the virtual space), recommending virtual space activities and/or objects, and/or any other virtual space messages may be generated and communicated to the second user on behalf of the first user. This may improve user experience in the virtual space by dynamically generating communications to facilitate virtual space interactions between virtual space users having real-world relationships. This may improve virtual space user retention rate for the provider of the virtual space.

In some implementations, a system configured to dynamically generate virtual space message on behalf of a user in the virtual space may include a system server. The system server may be configured to execute one or more of a user module, a contact-list module, a contact-entry module, a user-presence module, a message module, and/or other modules.

The user module may be configured to obtain user information of individual users in the virtual space. The obtained virtual space user information may include information stored by a virtual space server, one or more of client computing platforms, external resources (e.g., web service providers), and/or other storage locations. The obtained virtual space user information may include, for example, information identifying users (e.g., a username or handle, a number, an identifier, and/or other identifying information) within the virtual space, a phone number, email address associated with a user, and/or other information related to the virtual space users. To obtain such user information, the user module may be configured to interface with the virtual space server, client computing platforms, external resources, and/or any other storage locations through any suitable wired and/or wireless communication channels. The interfaces may include, for example, but not limited to, application programming interface (API), CGI or WSGI, and/or any other communication methods facilitated by the virtual space server, client computing platforms, external resources, and/or any other storage locations for retrieving the virtual space user information.

The contact-list module may be configured to obtain contact lists associated with the users of the virtual space. The obtained contact lists may include, but not limited to, user contact lists stored by the virtual space server, address books and/or contact files stored on the client computing platforms associated with the users, contact information stored by software implemented on client computing platform, contact registers stored by internet service providers, contact information provided by telecommunication service providers, contact lists stored by email service providers, and/or any other contact lists. The obtained contact lists may comprise one or more contact entries providing information about contacts in relation to the owners of the contact lists. The information about a contact as provided by a contact entry may indicate, but not limited to, a name of the contact, one or more telephone numbers associated with the contact, one or more email addresses associated with the contact, one or more real-world addresses associated with the contact, a relationship between the contact and the owner of the contact list, a group status of the contact as classified by the owner of the contact list, records of communications between the contact and owner of the contact list, content of the individual communications between the contact and the owner of the contact list, and/or any other information about the contact. The contact-list module may be configured to obtain such contact lists from the virtual space server, client computing platforms, and/or any other external resources.

The contact-entry module may be configured to obtain contact entries from the contact lists obtained by the contact-entry module and correlate the contact entries with users in the virtual space. For obtaining individual contact entries included in a contact list obtained by the contact-list module, the contact-entry module may be configured with semantics, such as, but not limited to, information indicating delimiters that separate individual contact entries in a contact list and/or any other semantics to parse the contact list. For correlating individual entries in a contact list with corresponding virtual space users, the contact-entry module may be configured to extract identifying information, such as, but not limited to, the name, the telephone number, email address(es), real-world address(es) and/or any other identifying information of a contact from a contact entry. The contact-entry module may be configured to compare the extracted identifying information of a contact entry with user information obtained by the user module. A correlation may be made by the contact-entry module in cases where the extracted identifying information of a contact entry corresponds to the user information of a user in a virtual space.

In some examples, the contact-entry module may be configured to determine a relationship between users of the virtual space based on the contact entries. This may involve parsing the contact entry for information indicating a relationship between the contact and owner of the contact list. In some examples, the contact-entry module may be configured to determine that a virtual space user was introduced to join the virtual space by another user based on the communications between the two users as indicated by contact information extracted from one or more contact lists associated with the two users. For such determinations, the contact-entry module may be configured with semantics, such as, but not limited to, keywords, promotion code patterns, and/or any other any other semantics for determining such a virtual space induction relationship between the users of the virtual space.

The user-presence module may be configured to determine users being present in the virtual space executed and implemented by the virtual space server. For such determinations, in some examples, the user-presence module may send queries to the virtual space server at a sampling rate predetermined by the developer, provider, administrator, and/or any other entities related to the system server. Simultaneously and/or alternatively, the user-presence module may be configured to query the virtual space server dynamically, for example, in response to contacts being correlated with virtual space by the contact-entry module. The user-presence module may receive responses from the virtual space server for determinations whether individual users are present in the virtual space.

The message module may be configured to generate virtual space messages for communicating with virtual space users based on the contact information indicated by the contact entries. The generated virtual space messages may facilitate social interaction, mentorship, friendship, and/or any other relationships between users within the virtual space. The messages may facilitate social interactions between a user and his/her contacts, both being users of the virtual space. For instance, the generated message may invite, on behalf of the user, his/her contacts to join a quest, mission, or campaign in the virtual space with the user. The messages may facilitate mentorship between the user and his/her contacts. For instance, the generated message may recommend the contacts to join an alliance the user belongs to, to build certain infrastructure, and/or any other virtual space information that may help further the contacts' progression in the virtual space. In some examples, the messages may simply facilitate friendship between the user and his/her contacts by, for example, welcoming the contacts to the virtual space.

In some implementations, the message module may be configured to determine a communication means through which a message generated on behalf of a user by the message module may be communicated to his/her contact based on the contact information obtained from the contact list associated with the user. In some implementations, user interfaces may be provided to facilitate the user to specify preferred ways to communicate with his/her contacts, frequencies at which to communicate with the contacts, type of messages for the communication, and/or any other parameters for the message module. In those implementations, the message module may generate and communicate virtual space messages to a user's contact in accordance with such user specified parameters. In some implementations, the message module may be configured to generate and communicate the virtual space messages in response to determinations that both the user and the contact are present in the virtual space as determined by the user-presence module.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
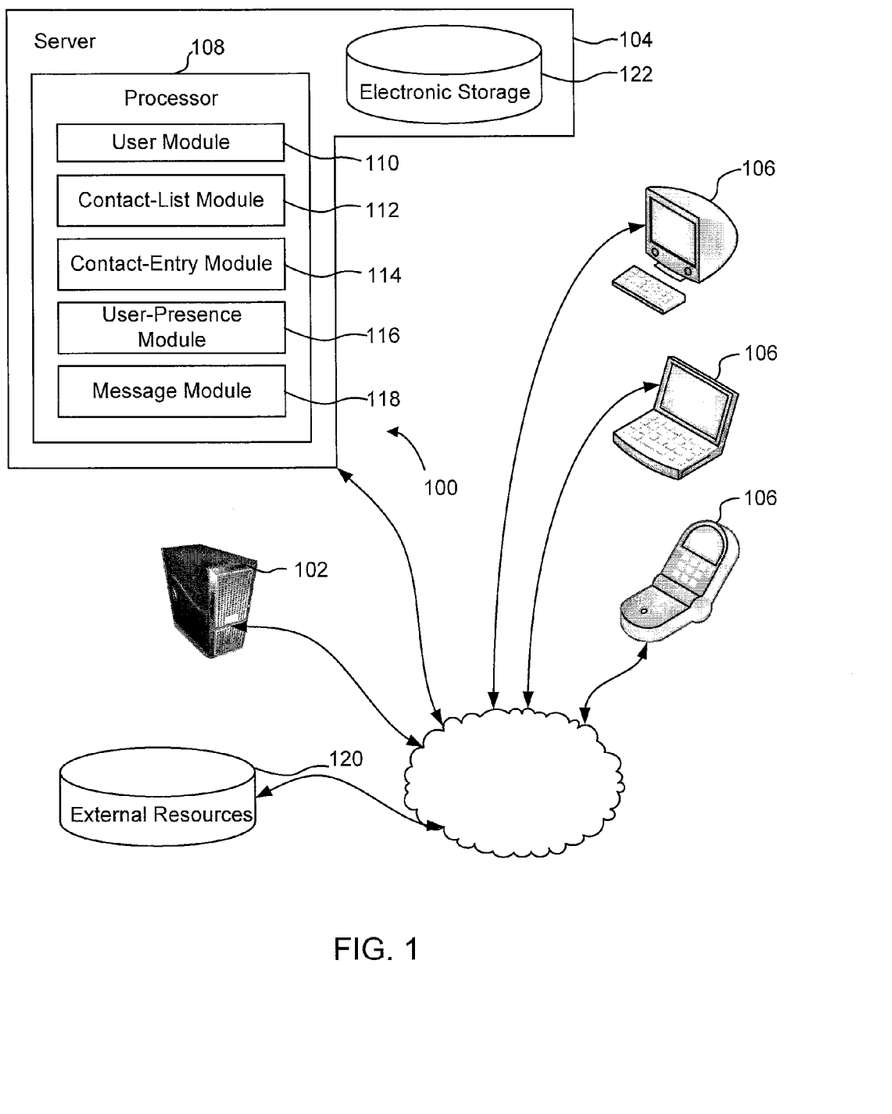
FIG. 1 illustrates one example of a system configured to generate virtual space messages based on information in a user's contact list.

FIG. 1 illustrates one example of a system configured to generate virtual space messages based on information in a user's contact list. The contact list may be stored by and obtained from a virtual space server, a client computing platform, internet resources, and/or any other sources that may provide a contact list associated with a user of the virtual space. Contact entries may be obtained from such a contact list and correlated with other users in the virtual space. In some examples, real-world relationships between the owner of the contact list and his/her contacts, both being users of the virtual space, may be determined based on the contact information indicated by the obtained contact list. Virtual space messages, for example, to facilitate social interactions, mentorship, friendship and/or any other virtual space relationships between the owner of the contact list and his/her contacts may be generated and communicated to the contacts on behalf of the owner of the contact list. This may enhance virtual space user experience by dynamically generating communications to further a contact's progression in the virtual space and/or to facilitate social interactions between virtual space users. This may improve virtual space user retention rate for the provider of the virtual space as users may be connected and/or motived to interact with the virtual space and/or one another by such generated communications.

In some implementations, system 100 may include a system server 104 and/or any other components. The system server 104 may be configured to communicate with one or more client computing platforms 106 according to a client/server architecture. The system server 104 may communicate with a virtual space server 102 through any suitable communication channels, such as, but not limited to, application programming interface (API), web interface including CGI, WSGI, and/or any other suitable communication channels. The users may access system 100 and/or the virtual space via client computing platforms 106. System server 104 may be configured to execute one or more computer program modules. The one or more computer program modules may include user module 110, contact-list module 112, contact-entry module 114, user-presence module 116, message module 118, and/or other modules.

The user module 110 may be configured to obtain user information of individual users of the virtual space. The obtained virtual space user information may include information stored by virtual space server 102, one or more of the client computing platforms 106, external resources 120 (e.g., telecommunication services, internet service, email services providers and/or any other external resources), and/or other storage locations. The obtained virtual space user information may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number and/or email address associated with a user, and/or other information related to users.

To obtain such user information, the user module 110 may be configured to interface with the virtual space 102, client computing platforms 106, external resources 120, and/or any other storage locations through any suitable wired and/or wireless communication channels. The interfaces may include, for example, but not limited to, application programming interface (API), CGI or WSGI, and/or any other communication methods facilitated by the virtual space server 102, external resources 120, and/or client computing platform 106 for retrieving the virtual space user information.

The contact-list module 112 may be configured to obtain contact lists associated with the users of the virtual space. The obtained contact lists may include, but not limited to, user contact lists stored by the virtual space server 102, address books stored on the client computing platforms 106 (e.g., electronic phone book stored on smartphones of the users), contact information stored by software implemented on client computing platform 106 (e.g., contact information stored by email clients implemented on the client computing platforms 106), contact files stored on the client computing platforms 106 (e.g., spreadsheet files), contact registers stored by internet service providers (e.g., cloud computing services, internet communication services, etc.), contact information provided by telecommunication service providers (e.g., wireless service, phone service, etc.) contact lists stored by email service providers, and/or any other contact lists. The obtained contact lists may comprise one or more contact entries providing information about contacts in relation to the owners of the obtained contact lists. The information about a contact as provided by a contact entry may indicate, but not limited to, a name of the contact, one or more telephone numbers (e.g., work phone, home phone, cell phone, etc.) associated with the contact, one or more email addresses associated with the contact, one or more real-world addresses (e.g., home address, work address, mailing address, residence address, etc.) associated with the contact, a relationship with the owner of the contact list (e.g., friend, relative, co-worker, classmate, etc.), a group status as classified by the owner of the contact list (e.g., a member of close circle, a member of co-workers at a company the owner of the contact list works at, a member of classmates at a school the owner of the contact list attends, etc.), records of communications between the contact and owner of the contact list (e.g., time and duration of the communications), content of the individual communications (e.g., actual email messages, text messages, chat sessions, etc. between the contact and owner of the contact list), and/or any other information about the contact.

The contact-list module 112 may be configured to obtain such contact lists from the virtual space server 102, client computing platforms 106, and/or external resources 120. For individual users, the virtual space sever 102 may manage contact lists for users of the virtual space. For example, virtual space users' contact lists may be managed by the virtual space server 102 and stored in one or more user databases connected to the virtual space sever 102. In some examples, users' contact lists may be obtained by the contact-list module 112 from individual computing platforms 106 associated with individual users of the virtual space. Software modules may be executed on a client computing platforms associated with a virtual space user 106 for providing contact list(s) of the virtual space user, e.g., by retrieving contact lists stored on the client computing platform 106. In those examples, the contact-list module 112 may be configured to communicate with the user client computing platforms 106 via such software modules to obtain the contact lists. In some examples, users' contact lists may be obtained by the contact-list module 112 from external resources 120, e.g., such as, but not limited to, email service providers (internet email and/or intranet email service providers), telecommunication service providers (wireless, phone, etc.), internet service providers (e.g., online chat services, conference services, voice communication services, and/or any other internet service providers), and/or any other external resources 120. For obtaining the contact lists from such external resources 120, the contact-list module 112 may be configured to communicate with the external resources 120 using application programming interfaces (API), web interfaces, and/or any other communication methods provided by the external resources 120 for obtaining the contact lists. For example, user credentials of the external resources may be provided by the contact-list module 112 through the API provided by an external resource 120 and upon verification of the user credentials the external resource 120 may push the contact list associated with that user stored on the external resource 120 to the system server 104 via the contact-list module 112.

The contact-entry module 114 may be configured to obtain contact entries from the contact lists and correlate the contact entries with users in the virtual space. For obtaining individual contact entries included in a contact list obtained by the contact-list module 112, the contact-entry module 114 may be configured with semantics, such as, but not limited to, information indicating delimiters that separate individual contact entries in a contact list (e.g., such delimiters may be specified by the source of the contact list; and may include, but not limited to, tabs, slashes, commas, semi-colons, and/or any other delimiters that may be used to separate contact entries in a contact list) and/or any other semantics to parse the contact list. For correlating individual entries in a contact list with corresponding virtual space users, the contact-entry module 114 may be configured to extract identifying information, such as, but not limited to, the name, the telephone number, email address(es), real-world address(es) and/or any other identifying information of a contact from a contact entry. For such extractions, delimiter information that separates individual fields in the contact entry and syntax for recognizing such identifying information (e.g., telephone number comprises all numbers, email addresses comprise an @ symbol, real-world address comprise a street name, city, state/province and/or a zip code, etc.) may be configured with the contact-entry module 114 by the provider, administrator, moderator, and/or any other entities related to the system server 104.

The contact-entry module 114 may be configured to compare the extracted identifying information of a contact entry with user information obtained by the user module 110. A correlation may be made by the contact-entry module 114 in cases where the extracted identifying information of a contact entry corresponds to user information of a user in a virtual space. For example, the user information may comprise information indicating a telephone number, an email address, a real-world address and/or any other user information that corresponds to the telephone number, email address, real-world address and/or any other corresponding identifying information extracted from a contact entry in an obtained contact list. In this way, the contact may be correlated with the user in the virtual space by the contact-entry module 114.

In some examples, the contact-entry module 114 may be configured to determine a relationship between users of the virtual space based on the contact information obtained from the contact entries. In some cases, the obtained contact entries may comprise information readily indicate a relationship between the contact and the owner of the contact list. For example, the contact entry may indicate that contact A is a friend, classmate, co-worker, relative or any other relationships as specified by the owner of the contact list. In those cases, the contact-entry module 114 may simply employ such relationship information provided by the contact entry and determine that the relationship between the two virtual space users, i.e., one corresponding to the owner of the contact list and the other corresponds to the contact as correlated by the contact-entry module 114. In some cases, the contact entry may not readily provide information indicating such a relationship between the contact and owner of the contact list. In those cases, the contact-entry module 114 may be configured to parse actual communications for a determination of a relationship between the contact and owner of the contact list. For example, the contact-entry module 114 may be configured with semantics to parse email messages between the contact and contact list owner for such a relationship determination: e.g., the contact-entry module 114 may be configured to detect salutations in the email messages to determine a relationship between the contact and contact list owner.

In some examples, the contact-entry module 114 may be configured to determine that a virtual space user was introduced to join the virtual space by another user based on the contact information extracted from a given contact entry. For such determinations, the contact-entry module 114 may be configured with semantics, such as, but not limited to, keywords, promotion code patterns, and/or any other any other semantics for determining from the communications included in a given contact entry such a virtual space induction relationship. For example, the contact-entry module 114 may be configured to parse email, text, chat and/or any other messages included in the contact entries and detect keywords, such as, but not limited to, "join the virtual space", "join me in the virtual space", "let's play", and the like, promotion codes and/or invitation templates provided by the provider of the virtual space for users to invite their contacts to join the virtual space, and/or any other information indicating that a virtual space user (i.e., the contact) was introduced to join the virtual space through communications by another virtual space user (i.e., the owner of the contact list).

The user-presence module 116 may be configured determine users being present in the virtual space provided by the virtual space server 102. For such determinations, in some examples, the user-presence module 116 may send queries to the virtual space server 102 at a sampling rate predetermined by the developer, provider, administrator, and/or any other entities related to the system server 104. Simultaneously and/or alternatively, the user-presence module 116 may be configured to query the virtual space server 102 dynamically, for example, in response to correlating contacts with virtual space users by the contact-entry module 114. In any case, the contact-entry module 114 may receive responses from the virtual space server 102 for determinations whether individual users are present in the virtual space. For example, the virtual space 102 may respond with a list of all users who are present in the virtual space and the user-presence module 116 may parse that list to determine whether specific users are present in the virtual space.

The message module 118 may be configured to generate virtual space messages to virtual space users based on the contact information indicated by the contact entries. The generated virtual space messages may facilitate social interaction, mentorship, friendship, and/or any other relationships between the two users within the virtual space. The facilitated social interaction may include messages to invite a contact of a virtual space user, the contact being another user of the virtual space as correlated by the contact-entry module 114, to participate in virtual space activities, such as, but not limited to, missions, quests, campaigns, and/or any other virtual space activities with the virtual space user, to collaborate with the virtual space user in virtual space actions (e.g., to transfer virtual space resources to the user, to send troops to a virtual space location controlled by the user, and/or any other collaborations), to compete with the virtual space user in the virtual space (invitation to a battle, challenge in a race—e.g., can you beat me in a race, etc.), to engage in group activities with the virtual space user (e.g., team play, alliance activities, roleplaying, and/or any other group activities), and/or to engage in any other social interactions with the user. The facilitated mentorship between the two users may include messages to suggest, recommend, or otherwise inform the user's contact, on behalf the virtual space user, virtual space groups to join (e.g., recommending specific alliances for the contact to join), activities to participate (e.g., recommending quests, missions, campaigns, and/or any other virtual space activities so that the contact may further his/her progress in the virtual space efficiently), actions to take (e.g., build specific infrastructures, order of building such infrastructures, certain monsters to kill, and/or any other virtual space actions that the contact should engage in to his/her progress in the virtual space efficiently), virtual space item to acquire (e.g., to purchase certain useful virtual space items from the virtual store operated by the provider of the virtual space, to craft certain items, etc.), virtual space topology information (e.g., specific virtual space locations, routes, direction for traversing in the virtual space), tips about the virtual space, and/or any other information that may help the contact to further his/her progression in the virtual space.

In any case, the message module 118 may be configured to generate such virtual space messages based on the contact information as obtained by the contact-entry 114. For example, the message module 118 may be configured to generate messages on behalf of the virtual space user to one or more his/her contacts, who are also users of the virtual space. The messages may facilitate social interactions between the virtual space user and his/her contacts. For instance, the generated message may invite, on behalf of the virtual space user, his/her contacts to join a quest, mission, or campaign in the virtual space with the user. The messages may facilitate mentorship between the user and his/her contacts. For instance, the generated message may recommend the contacts to join an alliance the user belongs to, to build certain infrastructure, and/or any other virtual space information that may help further the contacts' progression in the virtual space. In some examples, the messages may simply facilitate friendship between the user and his/her contacts by, for example, welcoming the contacts to the virtual space.

In some implementations, the message module 118 may be configured to generate the virtual space message to a user's contacts, who are also virtual space users, based on relationships between the user and the contacts as indicated by the contact information obtained from the contact list of the virtual space user. For example, in cases where the contact information indicates a contact as a friend of the user, messages to invite the contacts, for example, to collaborate with the virtual space user in the virtual space, to engage in group activities in the virtual space, and/or to engage in any other interactions with the virtual space user in the virtual space. In another example, in cases where the contact was introduced to join the virtual space by the user, the message module 118 may be configured to generate a message recommending virtual space activities, items, actions, and/or any other virtual space information to the contact for mentoring. In still another example, in cases where the contact is a co-worker of the user, the message module 118 may be configured to generate a message to challenge the contact in the virtual space, e.g., without limitation, to compete in a race with the virtual space user in the virtual space.

In some implementations, the message module 118 may be configured to determine a communication medium through which a generated message by the message module 118 may be communicated to the contact based on the contact information obtained from the contact list of the virtual space user. Such a communication medium may include communication means provided by the virtual space and/or communication means external to the virtual space. The communication medium provided by the virtual space may include, but not limited to, virtual space email system, chat system, virtual space notification system (e.g., notifications in the virtual space interface implemented on client computing platforms 106), and/or any other virtual space communication means. The external communication means may include email services provided a third party (e.g., internet email service provider), texting services provided by a telecommunication service provider (e.g., wireless texting), voice mail services provided by a third party provider (e.g., internet voice services), and/or any other external communication means. In some determinations, the message module 118 may be configured to determine an optimal communication medium for communicating the generated message to the contact based on the contact information obtained from the contact list associated with the virtual space user. For example, in cases where the communication record information indicates that the contact and the virtual space user have engaged in communications most often through texting, the message module 118 may determine that the generated message to that contact should be communicated via texting on behalf of the virtual space user.

In some implementations, user interfaces may be provided to facilitate virtual space users to specify preferred ways (e.g., email, text, voice mail, etc.) to communicate with his/her contacts (who are also virtual space users), frequencies at which to communicate with the contacts, type of messages for the communication (e.g., for contact A, send mentorship type message, for Contact B send collaboration type message, for Contact C, send competition message, and so on) and/or any other parameters for the message module 118. In those implementations, the message module 118 may generate and communicate virtual space messages to a user's contact in accordance with such user specified parameters.

In some implementations, the message module 118 may be configured to generate and communicate the virtual space messages in response to determinations that both the user and the contact are present in the virtual space as determined by the user-presence module 116. For example, the message module 118 may send a message to invite an online contact of an online user to participate in a quest such that both users may engage in the quest together instantly.

A given virtual space 102 server may include one or more processors configured to execute computer program modules which may execute and implement an instance of the virtual space for interaction. The virtual space server 102 may be connected with other components server through any suitable wired or wireless connections. Although in this example the virtual space 102 and system server 104 are illustrated as distinct components of the system 100, in some other examples, they may be combined in one server to provide integrated functionalities of the virtual space 102 and system server 104.

The virtual space server 102 may execute and implement an instance of virtual space for virtual space users to interact with the virtual space. The instance of the virtual space may reflect the state of the virtual space. The instance of the virtual space may be used to push state information to clients for implementation on the clients, may be used to verify state information generated on clients executing expressions of the instance locally, and/or for other purposes. The instance of the virtual space may comprise a simulated space that is accessible by users via clients (e.g., client computing platforms 106) that present the views of the virtual space to a user through a space interface implemented on client computing platform associated with the user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space.

Within the instance of the virtual space executed and implemented by the virtual space server 102, users may control characters, objects, simulated physical phenomena (e.g., wind, rain, earthquakes, and/or other phenomena), and/or other elements within the virtual space to interact with the virtual space and/or each other. Within the instance of the virtual space, virtual space activities may be provided for users to interact with the virtual space. Examples of virtual space activities may include crafting virtual items, harvesting virtual space elements, constructing, upgrading, and/or demolishing buildings, training, marching, reinforcing, reassigning, recruiting, arranging formations, and/or transporting troops, attacking, developing, managing, demolishing and/or defending cities, realms, kingdoms, and/or any other virtual space locations, researching for skills levels, experiences, mining and/or prospecting for virtual resources, participating in missions, quests, and/or campaigns, and/or any other activities provided by the virtual space. Some virtual space activities may engage the users against an environment within the virtual space—i.e., PvE activities. In some examples, the virtual space activities may engage the users to compete against one another within the virtual space—i.e., PvP activities. Such virtual space activities typically provide opportunities and/or motivations for users to progress in the virtual space. Within the instance of the virtual space, users may interact with one another. Interaction between the users may include user competition, group activities, collaboration and/or any other user interactions.

A given client computing platform 106 may include one or more processors configured to execute computer program modules. The computer program modules may be configured to enable an expert or user associated with the given client computing platform 106 to interface with virtual space server 102, system server 104 and/or external resources 120, and/or provide other functionality attributed herein to client computing platforms 106. By way of non-limiting example, the given client computing platform 106 may include one or more of a desktop computer, a laptop computer, a handheld computer, a tablet computing platform, a NetBook, a Smartphone, a gaming console, and/or other computing platforms.

The external resources 120 may include internet service providers, telecommunication service providers, email service providers, sources of information, hosts and/or providers of virtual environments outside of system 100, external entities participating with system 100, and/or other resources. In some implementations, some or all of the functionality attributed herein to external resources 120 may be provided by resources included in system 100.

The system server 104 may include electronic storage 122, one or more processors 120, and/or other components. The system server 104 may include communication lines, or ports to enable the exchange of information with a network and/or other computing platforms. Illustration of system server 104 in FIG. 1 is not intended to be limiting. The system server 104 may include a plurality of hardware, software, and/or firmware components operating together to provide the functionality attributed herein to system server 104. For example, system server 104 may be implemented by a cloud of computing platforms operating together as system server 104.

Electronic storage 122 may comprise electronic storage media that electronically stores information. The electronic storage media of electronic storage 122 may include one or both of system storage that is provided integrally (i.e., substantially non-removable) with server 102 and/or removable storage that is removably connectable to server 104 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor 120, information received from server 102, information received from client computing platforms 104, and/or other information that enables server 104 to function as described herein.

Processor(s) 108 is configured to provide information processing capabilities in system server 104. As such, processor 108 may include one or more of a digital processor, an analog processor, a digital circuit designed to process information, an analog circuit designed to process information, a state machine, and/or other mechanisms for electronically processing information. Although processor x is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute modules 110, 112, 114, 116, 118. Processor 108 may be configured to execute modules 110, 112, 114, 116, 118 by software; hardware; firmware; some combination of software, hardware, and/or firmware; and/or other mechanisms for configuring processing capabilities on processor 120.

It should be appreciated that although modules 110, 112, 114, 116, 118 are illustrated in FIG. 1 as being co-located within a single processing unit, in implementations in which processor 108 includes multiple processing units, one or more of modules 110, 112, 114, 116, 118 may be located remotely from the other modules. The description of the functionality provided by the different modules 106, 110, 112, 114, 116, 118 described below is for illustrative purposes, and is not intended to be limiting, as any of modules 110, 112, 114, 116, 118 may provide more or less functionality than is described. For example, one or more of modules 110, 112, 114, 116, 118 may be eliminated, and some or all of its functionality may be provided by other ones of modules 110, 112, 114, 116, 118. As another example, processor 108 may be configured to execute one or more additional modules that may perform some or all of the functionality attributed below to one of modules 110, 112, 114, 116, 118.

Figure 2:
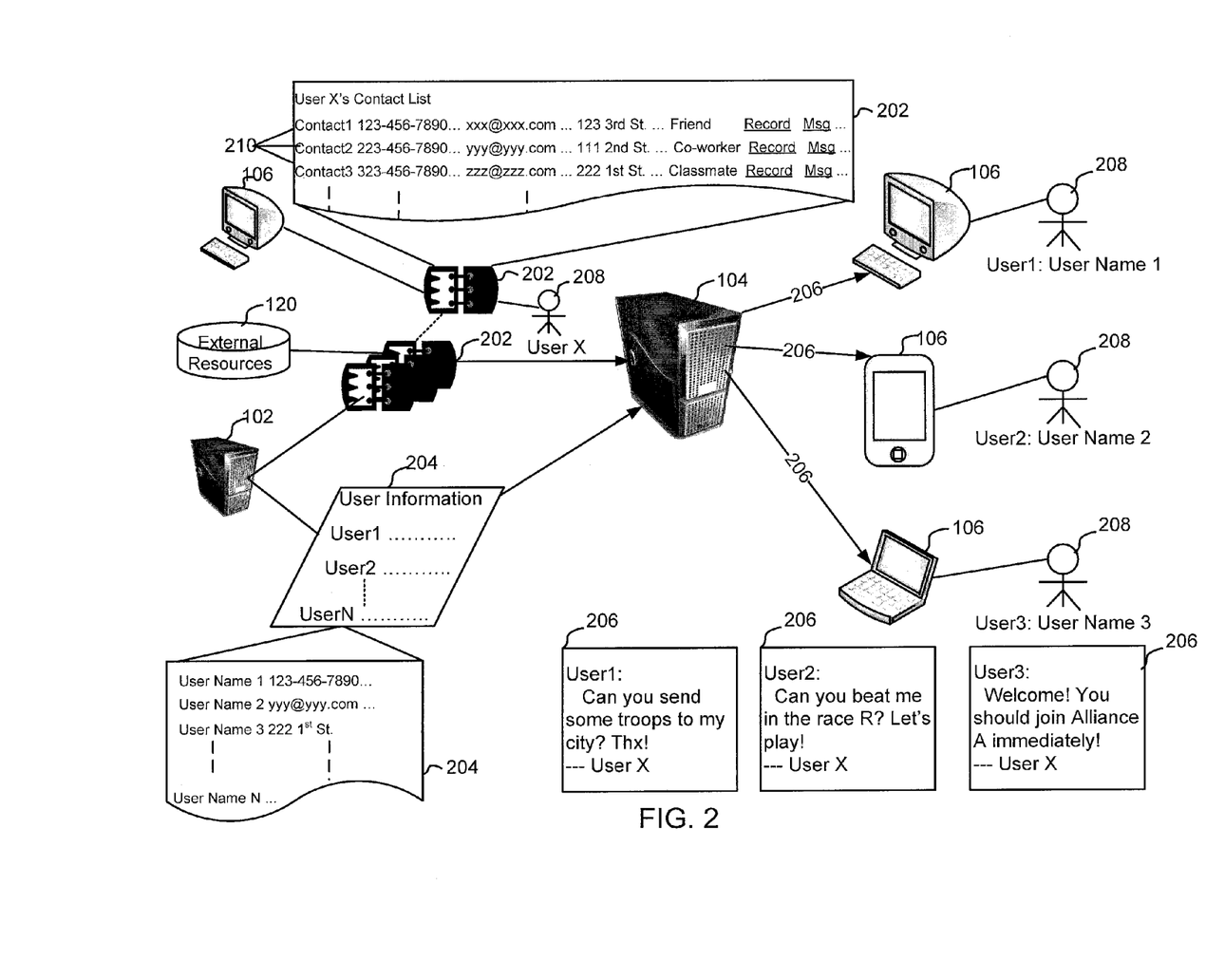
FIG. 2 Illustrates one example of generating virtual space messages based on user's contact list using system server as illustrated in FIG. 1.

FIG. 2 Illustrates one example of generating virtual space messages based on user's contact list using system server 104 as illustrated in FIG. 1. It will be described with references to FIG. 1. As shown, one or more contact lists 202 associated with a user X in the virtual space may be obtained by the system server 104. As illustrated, the contact lists may be obtained from client computing platform 106 associated with the user X, virtual space sever 102, external resources 120, such as, but not limited to, telecommunication service providers, Internet service providers, email service providers, and/or any other external resources 120. As illustrated, the contact lists 202 associated with user X, in this example, comprises contact entries 210 indicating contact information about contacts of the user X. As illustrated, the individual contact entries 210 may include identification information about a contact of the user X, such as name, one or more phone numbers, email addresses, real-world addresses, and/or any other identification information about the contact of user X. As also illustrated, the contact entries, in this example, include information indicating relationships between the contacts and the virtual space user; links through which communication records between the contacts and the user X may be accessed; links through which actual communications between the contacts and the user X may be accessed, and any other information.

As shown in this example, user information 204 of individual users in the virtual space is obtained by the system server 104. As described above and illustrated, such virtual space user information may be stored by and obtained from the virtual space server 102. In this example, the user information 204 comprises information indicating phone numbers, email addresses, real-world addresses, and/or any other identifying information about individual users in the virtual space. As described above, the user information 204 may be compared with the contact information obtained from the contact lists 202, e.g., by the contact-entry module 114 for correlating user contacts with virtual space users. In this example, as illustrated, user 1 having a user name 1 in the virtual space is correlated with contact 1 of the user X based on a corresponding phone number indicated by the contact list 202 and the user information 204; user 2 having a user name 2 in the virtual space is correlated with contact 2 of the user X based on a corresponding email address indicated by the contact list 202 and the user information 204; and user 3 having a user name 3 in the virtual space is correlated with contact 3 of the user X based on a corresponding real-world address indicated by the contact list 202 and the user information 204.

Based on the contact information obtained from the contact lists 202 and the virtual space user information 204, the system server 104 in this example generates and communicates one or more virtual space messages 206 to client computing platforms 106 associated with the contacts (i.e., also virtual space users) of the user X. As illustrated, a message 206 is generated and communicated to a client computing platform 106 associated with a user 208, i.e. the user 1 having a user name 1 in the virtual space. As indicated by the contact entry 210 in the contact list 202, user 1 is a friend of user X, and the system server 104 in this example generates a virtual space message 206, on behalf of the user X, to request the user 1 to send some troops to user X's city (i.e., a collaboration request message). Similarly, as shown, the system server 104 generates a virtual space message 206 challenging user 2, who is a co-worker of user X as indicated by the corresponding contact entry 210 in the contact list 202, to compete with user X in a race R provided by the virtual space; and generates a virtual space message 206 welcoming and recommending user 3, who is a classmate of user X, to join a virtual space alliance immediately (i.e., a mentorship message).

Figure 3:
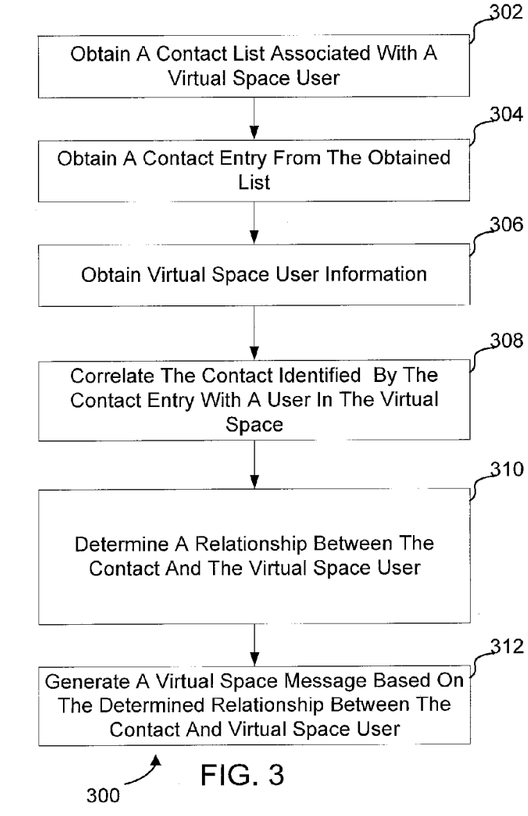
FIG. 3 illustrates an exemplary method for generating a virtual space message to a contact of a virtual space user.

FIG. 3 illustrates an exemplary method 300 for generating a virtual space message to a contact of a virtual space user. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 302, a contact list associated with a virtual space user may be obtained. Such a contact list may be obtained from a virtual space server that executes and implements the virtual space, a client computing platform associated with the virtual space user, external resources (e.g., telecommunication services, internet services, email services), and/or any other sources that may provide one or more contact lists associated with the virtual space user. In some implementations, operation 302 may be performed by a contact-list module the same as or similar to contact-list module 112 (shown in FIG. 1 and described herein).

At operation 304, a contact entry may be obtained from the contact list obtained in the operation 302. The contact list obtained in operation 302 may comprise one or more contact entries providing information about contacts in relation to virtual space user. The information about a contact as provided by a contact entry may indicate, but not limited to, a name of the contact, one or more telephone numbers (e.g., work phone, home phone, cell phone, etc.) associated with the contact, one or more email addresses associated with the contact, one or more real-world addresses (e.g., home address, work address, mailing address, residence address, etc.) associated with the contact, a relationship with the virtual space user (e.g., friend, relative, co-worker, classmate, etc.), a group status as classified by the virtual space user (e.g., a member of close circle, a member of co-workers at a company the owner of the contact list works at, a member of classmates at a school the owner of the contact list attends, etc.), records of communications between the contact and the virtual space user (e.g., time and duration of the communications), content of the individual communications (e.g., actual email messages, text messages, chat sessions, etc. between the contact and owner of the contact list), and/or any other information about the contact. For extracting such a contact entry from the contact list, semantics, e.g., information regarding delimiting the contact entries in the contact list may be determined. In some implementations, operation 304 may be performed by a contact-entry module the same as or similar to contact-entry module 114 (shown in FIG. 1 and described herein).

At operation 306, user information of individual users in the virtual space may be obtained. Such virtual space user information may be obtained from the virtual space server. In some implementations, operation 306 may be performed by a user module the same as or similar to user module 110 (shown in FIG. 1 and described herein).

At operation 308, the contact identified by the contact entry obtained in the operation 304 may be correlated with a user in the virtual space. In some implementations, operation 308 may be performed by a contact-entry module the same as or similar to contact-entry module 114 (shown in FIG. 1 and described herein).

At operation 310, a relationship between the contact as correlated with a user in the virtual space in the operation 308 and the virtual space user may be determined. The determined relationship may indicate that the contact is a friend, relative, co-worker, classmate, and/or any other relationship with the virtual space user. In some implementations, operation 310 may be performed by a contact-entry module the same as or similar to contact-entry module 114 (shown in FIG. 1 and described herein).

At operation 312, a virtual space message may be generated based on the relationship between the contact and the virtual space user as determined in the operation 310. The generated virtual space message may facilitate social interactions, mentorship, friendship, and/or any other relationship between the contact and the virtual space user within the virtual space. In some implementations, operation 312 may be performed by a message module the same as or similar to message module 118 (shown in FIG. 1 and described herein).

Figure 4:
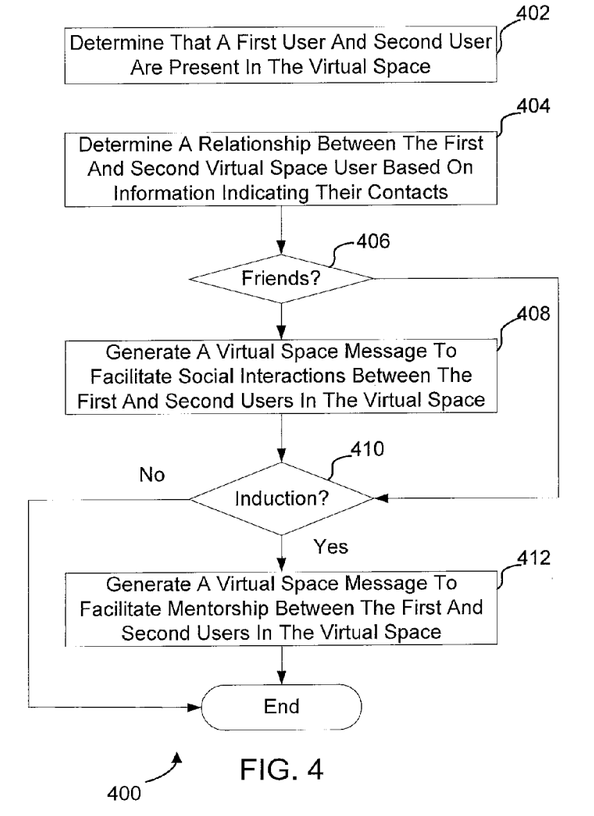
FIG. 4 illustrates an exemplary method for generating virtual space messages to facilitate interactions between virtual space users within the virtual space in accordance with the disclosure.

FIG. 4 illustrates an exemplary method 400 for generating virtual space messages to facilitate interactions between virtual space users within the virtual space in accordance with the disclosure. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 402, virtual space presences of a first user and a second user may be determined. In some implementations, operation 402 may be performed by a user-presence module the same as or similar to user-presence module 116 (shown in FIG. 1 and described herein).

At operation 404, a relationship between the first user and second user may be determined based on the information indicating their contacts. In some implementations, operation 404 may be performed by a contact-list module and contact-entry module the same as or similar to contact-list module 112 and contact-entry module 114 (shown in FIG. 1 and described herein).

At operation 406, a determination whether the first user and second user are friends as indicated by the contact information obtained in the operation 404 is made. In some implementations, operation 406 may be performed by contact-entry module the same as or similar to contact-entry module 114 (shown in FIG. 1 and described herein). In cases where it is determined that the two users are friends, the method 400 proceeds to operation 408. In cases where it is determined that the contact information obtained in the operation 404 does not indicate the two users are friends, the method 400 proceeds to operation 410.

At operation 408, a virtual space message for facilitating social interactions between the first user and the second user within the virtual space may be generated. The generated virtual space message in operation 408 may facilitate collaboration, competition, roleplaying, group activities, and/or any other social interactions between the first and second users in the virtual space. In some implementations, operation 408 may be performed by message module the same as or similar to message module 118 (shown in FIG. 1 and described herein).

At operation 410, a determination whether an induction relationship exists between the first and second user such that the first user was introduced to join the virtual space by the second user or vice versa is determined. In some implementations, operation 410 may be performed by contact-entry module the same as or similar to contact-entry module 114 (shown in FIG. 1 and described herein). In cases where it is determined that such an induction relationship exists between the first and second users, the method 400 proceeds to operation 412. In cases where it is determined that such an induction relationship does not exist between the first and second users, the method 400 proceeds to end.

At operation 412, a virtual space message for facilitate mentorship between the first and second user within the virtual space may be generated. In some implementations, operation 412 may be performed by message module the same as or similar to message module 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A non-transitory electronic storage media storing information related to dynamically generating game messages on behalf of a user in an online game, the stored information comprising:
    a memory configured to store information related to one or more users of the online game;
    instructions configured to cause a client computing platform to:
        obtain user information of individual ones of the users of the online game, the obtained user information comprising first user information associated with a first user in the online game and second user information associated with a second user in the online game;
        obtain contact lists associated with the users of the online game, the contact lists including one or more contact entries, such that a first contact list associated with the first user is obtained;
        obtain contact entries from the contact lists and correlate the contact entries with online game user information obtained such that responsive to the first contact list being obtained, a first contact entry is obtained from the first contact list and correlates the first contact entry with the second user;
        determine relationships between the users of the online game based on the contact entries such that a relationship between the first user and the second user is determined based on the first contact entry correlating to the second user;
        generate game messages to users of the online game without requiring initiations of the game messages by the users, such that responsive to the first contact entry being correlated to the second user a first game message is generated by the one or more processors on behalf of the first user for communication to the second user based on the first contact entry, wherein generating the first game message comprises determining content of the first game message based on the relationship between the first user and the second user as determined, such that responsive to the first user and the second user having a first type of relationship, first content is included in the first game message, and responsive to the first user and the second user having a second type of relationship, second content is included in the first game message, wherein the first content and the second content are different, and wherein generation of the first game message does not require initiation by the first user.

2. The non-transitory electronic storage media of claim 1, wherein the one or more processors are configured by machine-readable instructions such that correlating the first contact entry with the second user comprises obtaining identifying information from the first contact entry and corresponding the obtained identifying information to the second user information.

3. The non-transitory electronic storage media of claim 2, wherein the obtained identifying information of the first contact entry indicates a name, a phone number, an email address, and/or a real-world address.

4. The non-transitory electronic storage media of claim 1, wherein the instructions are further configured to cause a client computing platform to determine users being present in the online game such that the second user is determined to be present in the online game, and wherein the first game message is generated responsive to the determination that the second user is present in the online game and responsive to the first entry being correlated with the second user.

5. The non-transitory electronic storage media of claim 4, wherein the determined relationship between the first user and the second user indicates that the second user is a friend, a relative, a co-worker or a classmate of the first user.

6. The non-transitory electronic storage media of claim 5, wherein the determined relationship between the first user and the second user further indicates that the second user was introduced to join the online game by the first user.

7. The non-transitory electronic storage media of claim 1, wherein the generated first message facilitates social interactions and/or mentorship between the first user and second user within the online game.

8. The non-transitory electronic storage media of claim 1, wherein the instructions are further configured to cause a client computing platform to determine a first communication means for contacting the second user based on the first contact entry, and to effectuate a transmission of the generated game messages such that the transmission of the first message is effectuated to a client computing platform associated with the second user through the first communication means.

9. A method for dynamically generating game messages on behalf of a user in an online game, the method being implemented in one or more physical processors configured by machine-readable instructions, the method comprising:

obtaining user information of individual users of the online game, the obtained user information comprising first user information associated with a first user in the online game and second user information associated with a second user in the online game;

obtaining contact lists associated with the users of the online game, the contact lists including one or more contact entries, the obtained contact lists including a first contact list associated with the first user;

obtaining contact entries from the contact lists and correlating the contact entries with the user information obtained such that responsive to the first contact list being obtained, a first contact entry from the first contact list is obtained and correlated with the second user;

determining relationships between the users of the online game based on the contact entries such that a relationship between the first user and the second user is determined based on the first contact entry correlating to the second user; and generating game messages to users of the online game without requiring initiations of the game messages by the users, such that responsive to the first contact entry being correlated to the second user, generating, on behalf of the first user, a first game message for communication to the second user based on the first contact entry, wherein generating the first game message comprises determining content of the first game message based on the relationship between the first and the second user as determined such that responsive to the first user and the second user having a first type of relationship, first content is included in the first game message, and responsive to the first user and the second user having a second type of relationship, second content is included in the first game message, wherein the first content and the second content are different, and wherein generation of the first game message does not require initiation by the first user.

10. The method of claim 9, wherein correlating the first contact entry with the second user comprises obtaining identifying information from the first contact entry and corresponding the obtained identifying information to the second user information.

11. The method of claim 10, wherein the obtained identifying information of the first contact entry indicates a name, a phone number, an email address, and/or a real-world address.

12. The method of claim 9, further comprises determining that the second user is present in the online game, and wherein the first message is generated responsive to the determination that the second user is present in the online game and responsive to the first contact entry being correlated with the second user.

13. The method of claim 9, wherein the determined relationship between the first user and the second user indicates that the second user is a friend, a relative, a co-worker or a classmate of the first user.

14. The method of claim 13, wherein the determined relationship between the first user and the second user further indicates that the second user was introduced to join the online game by the first user.

15. The method of claim 9, wherein the generated first message facilitates social interactions and/or mentorship between the first user and second user within the online game.

16. The method of claim 9, further comprising determining a first communication means for contacting the second user based on the first contact entry, and effectuating a transmission of the first message to a client computing platform associated with the second user through the first communication means.

* * * * *